(12) United States Patent
Wang

(10) Patent No.: US 7,546,851 B2
(45) Date of Patent: Jun. 16, 2009

(54) CHANGE VALVE FOR AN AIR COMPRESSOR

(76) Inventor: Min-Hsieng Wang, P.O. Box 90, Tainan City 70499 (TW)

( * ) Notice: Subject to any disclaimer, the term of this patent is extended or adjusted under 35 U.S.C. 154(b) by 271 days.

(21) Appl. No.: 11/739,697

(22) Filed: Apr. 25, 2007

(65) Prior Publication Data

US 2008/0265200 A1    Oct. 30, 2008

(51) Int. Cl.
*F16K 11/085* (2006.01)
(52) U.S. Cl. .................. 137/625.47; 251/310
(58) Field of Classification Search .......... 137/625.16, 137/625.46, 625.47; 251/309, 310
See application file for complete search history.

(56) References Cited

U.S. PATENT DOCUMENTS

| | | | | |
|---|---|---|---|---|
| 2,702,050 A | * | 2/1955 | Thomas ................ | 137/625.16 |
| 2,994,339 A | * | 8/1961 | Massey ................ | 137/343 |
| 3,206,163 A | * | 9/1965 | Freed .................. | 251/309 |
| 3,703,910 A | * | 11/1972 | Smith ................... | 137/375 |
| 4,628,962 A | * | 12/1986 | Pezzarossi ............ | 137/625.47 |
| 4,854,545 A | * | 8/1989 | Pezzarossi ............ | 251/310 |
| 6,834,666 B2 | * | 12/2004 | Murayama et al. ...... | 137/269 |

* cited by examiner

*Primary Examiner*—John Fox

(57) ABSTRACT

A change valve for an air compressor is combined with the vent tube of an air compressor, including a connector, a valve base, a valve body, an anti-leak gasket, a sleeve and a button. The valve base has at least two connect tubes, with a guide tube connected to each of the connect tubes. The button can be turned to rotate the valve base together with the valve body, so the vent hole of the valve body can be aligned to the air hole of either of the two connect tubes. If the air compressor operates, compresses air may flow in the valve body via the air hole into the guide tube via the vent hole of the connect tubes, and finally into an object. In this way, interchanging the position of the vent hole of the valve body enables the change valve connected to objects having different air valves.

4 Claims, 6 Drawing Sheets

CHANGE VALVE FOR AN AIR COMPRESSOR

BACKGROUND OF THE INVENTION

1. Field of the Invention

This invention relates to a change valve for an air compressor, particularly to one able to connect with either of at least two or more guide tubes for selecting and interchanging the vent position of the change valve for convenient use.

2. Description of the Prior Art

A conventional air compressor 1 generally has a single vent tube 11, as shown in FIG. 1, at one side of a cylinder 10, and a joint 12 affixed on one end of the vent tube 11, and then the joint 12 can be connected threadably to an object with an air valve for pumping air, such as a tire, etc. As there is only one vent tube 11, so the joint 12 is also connected to only one object, impossible to be connected selectably to another object, very inconvenient to use.

SUMMARY OF THE INVENTION

This invention has been devised to offer a change valve, which is provided with at least two or more connect tubes for connecting with guide tubes and then connecting with objects with different air valves by selecting either of the guide tubes.

The features of the invention are a connector, a valve base, a valve body, an anti-leak gasket, a sleeve and a button. The connector is combined with the vent tube of a cylinder of an air compressor with a connect tube formed in a first end, and an air hole formed in a second end communicating with the connect tube. The valve base has a first end combined with a second end of the connector, a chamber formed in its interior, and a hole bored in a second end surface and communicating with the chamber, at least two connect tubes extending radially and spaced apart on an outer wall and having an air hole communicating with the chamber. Then a guide tube is connected to each of the connect tubes of the valve base, having a joint fixed on an outer end. The valve body is contained in the chamber of the valve base, having an annular recess in an outer wall, a vent hole bored in the annular recess and communicating with the chamber and plural projections spaced apart on the annular recess, and a rod member extending axially from a second end. The anti-leak gasket is inserted in the annular groove of the valve body, and the sleeve is fitted around the annular recess of the valve body, having a hole in an annular wall to face the vent hole of the valve body and plural position insert recesses spaced apart in an inner surface. The button is combined with an outer end of the rod member of the valve body for turning the valve body in the valve base so that the either of the two connect tubes of the valve base may be aligned to the vent hole of the valve body.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
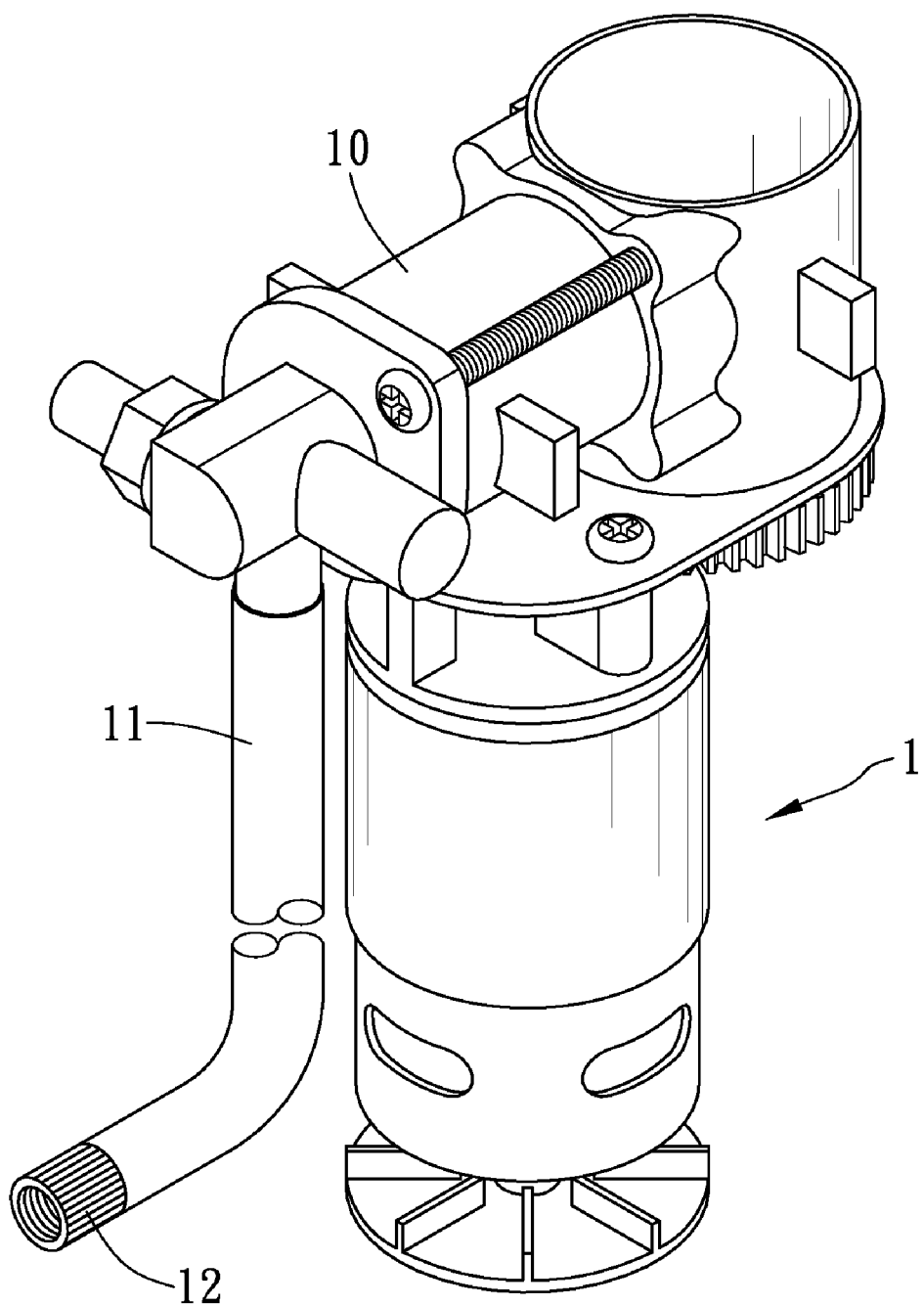
FIG. 1 is a perspective view of a conventional air compressor.
Figure 2:
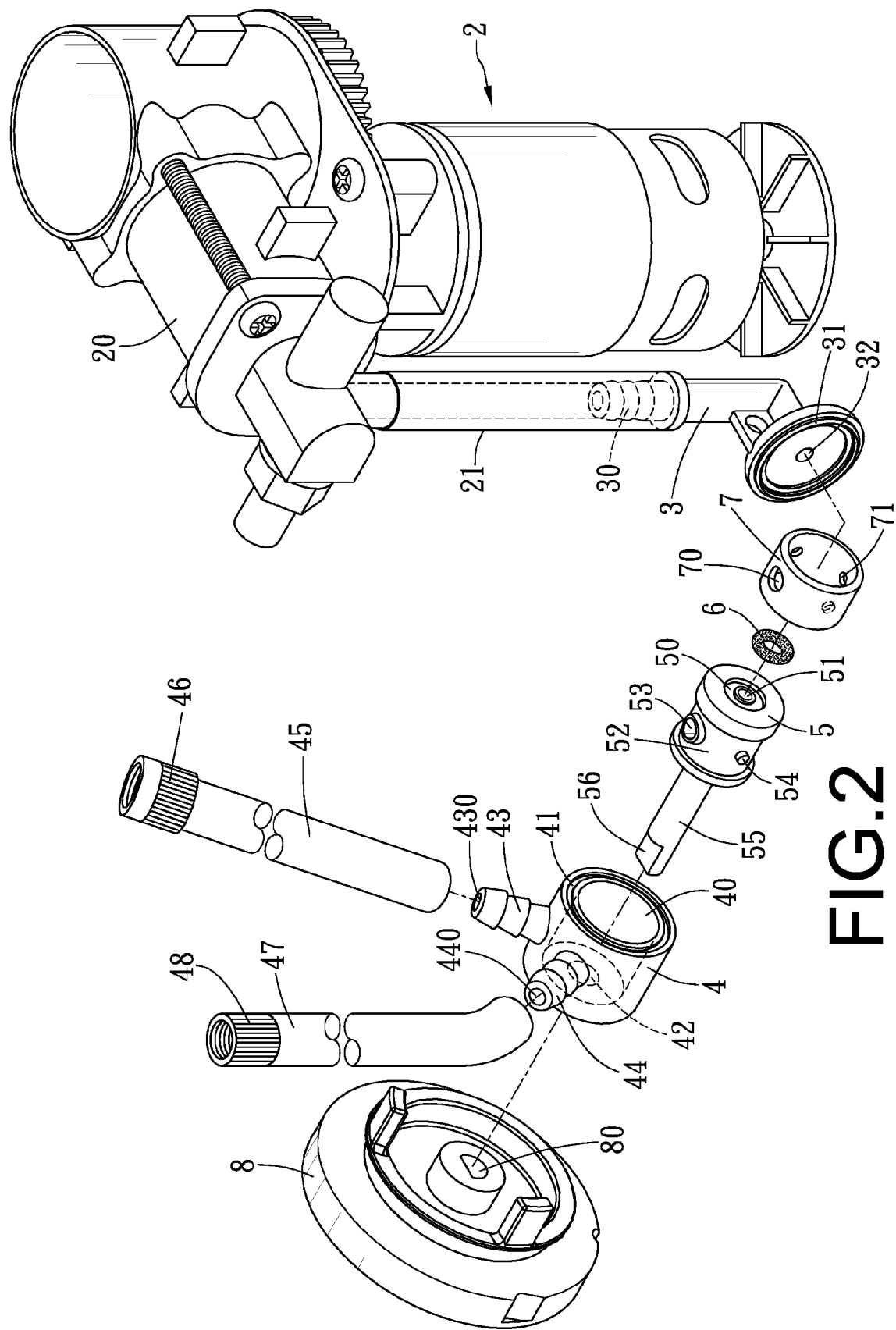
FIG. 2 is an exploded perspective view of a change valve for an air compressor in the present invention.
Figure 3:
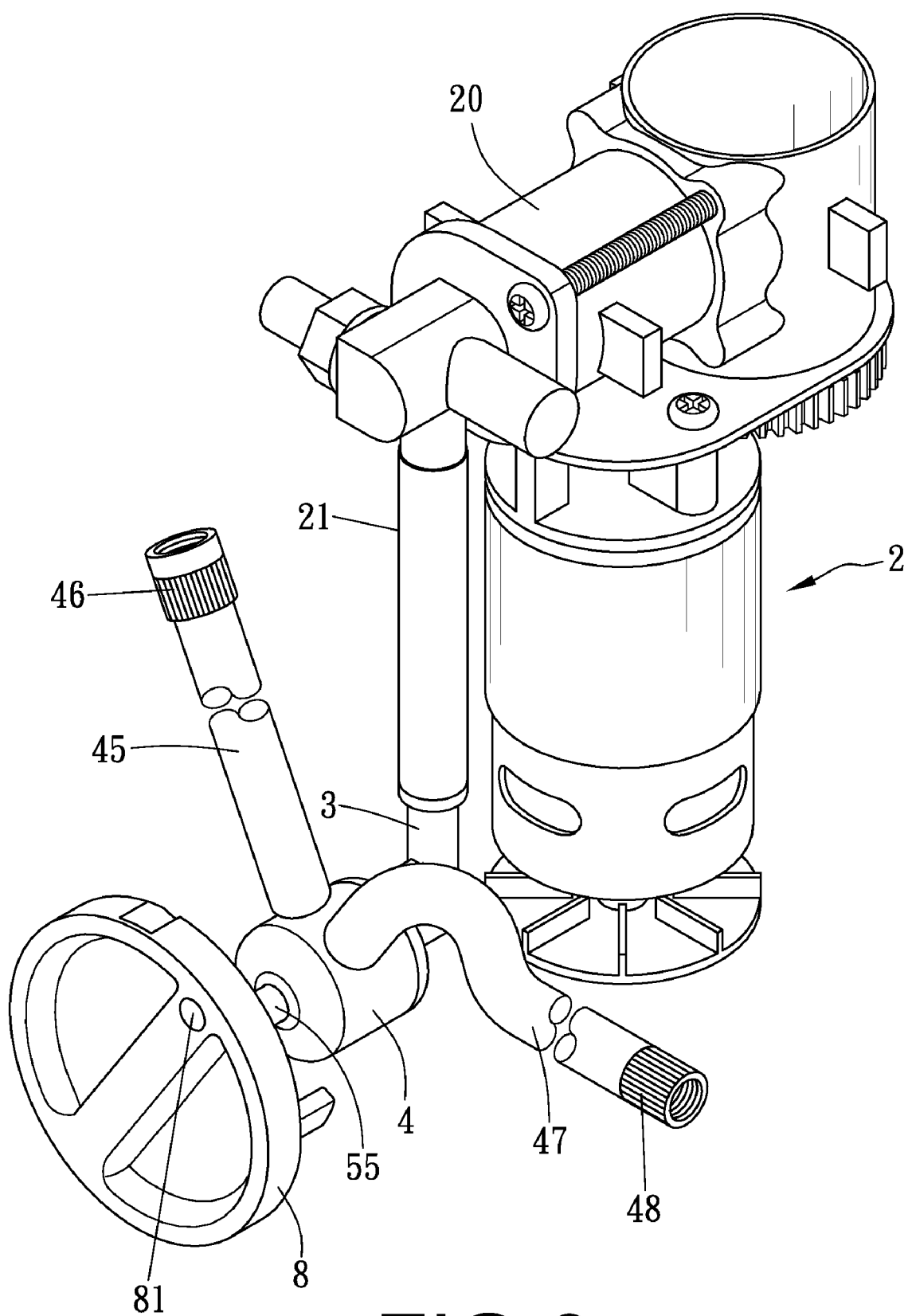
FIG. 3 is a perspective view of the change valve for an air compressor in the present invention.
Figure 4:
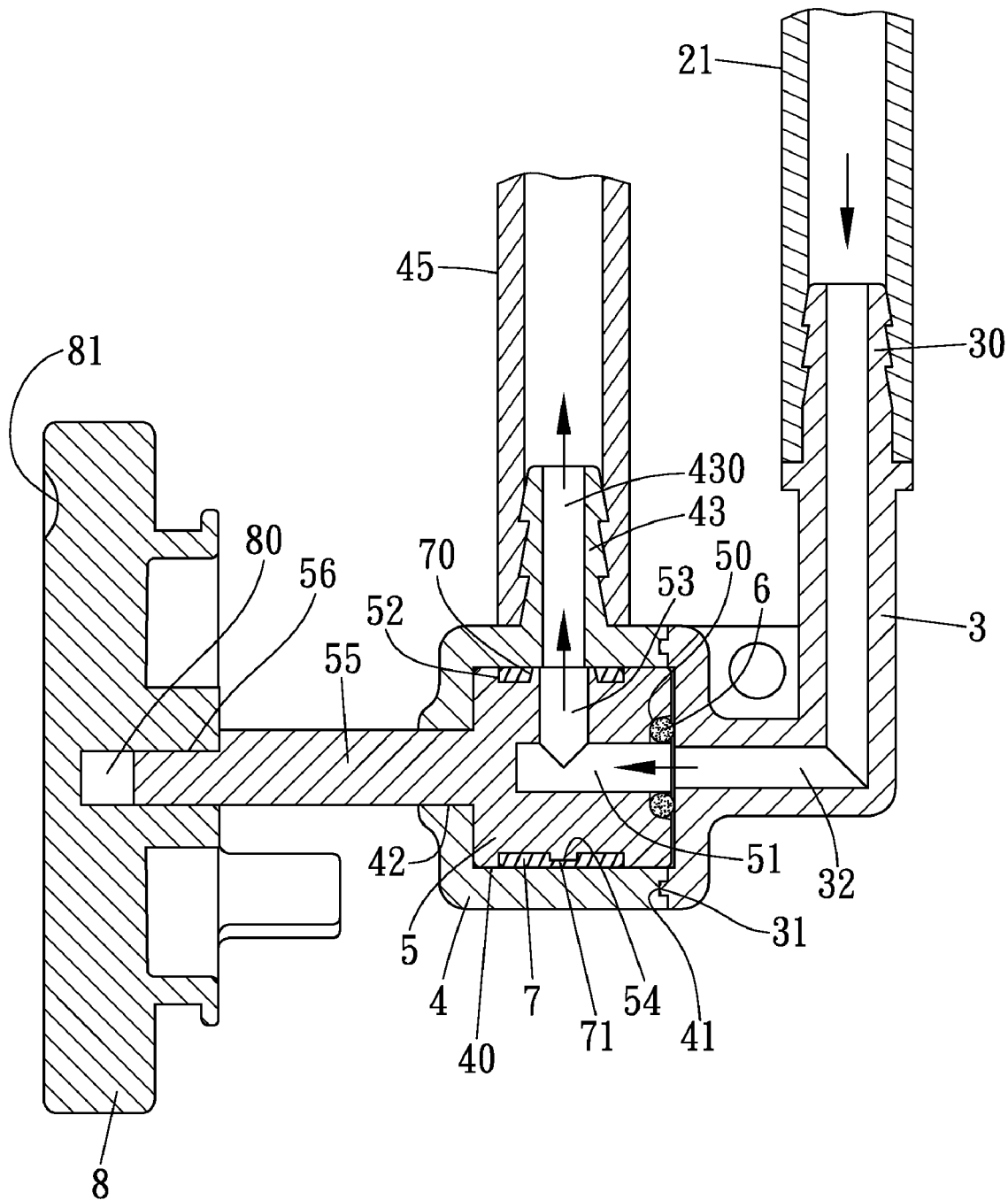
FIG. 4 is a cross-sectional view of the change valve for an air compressor in the present invention.
Figure 5:
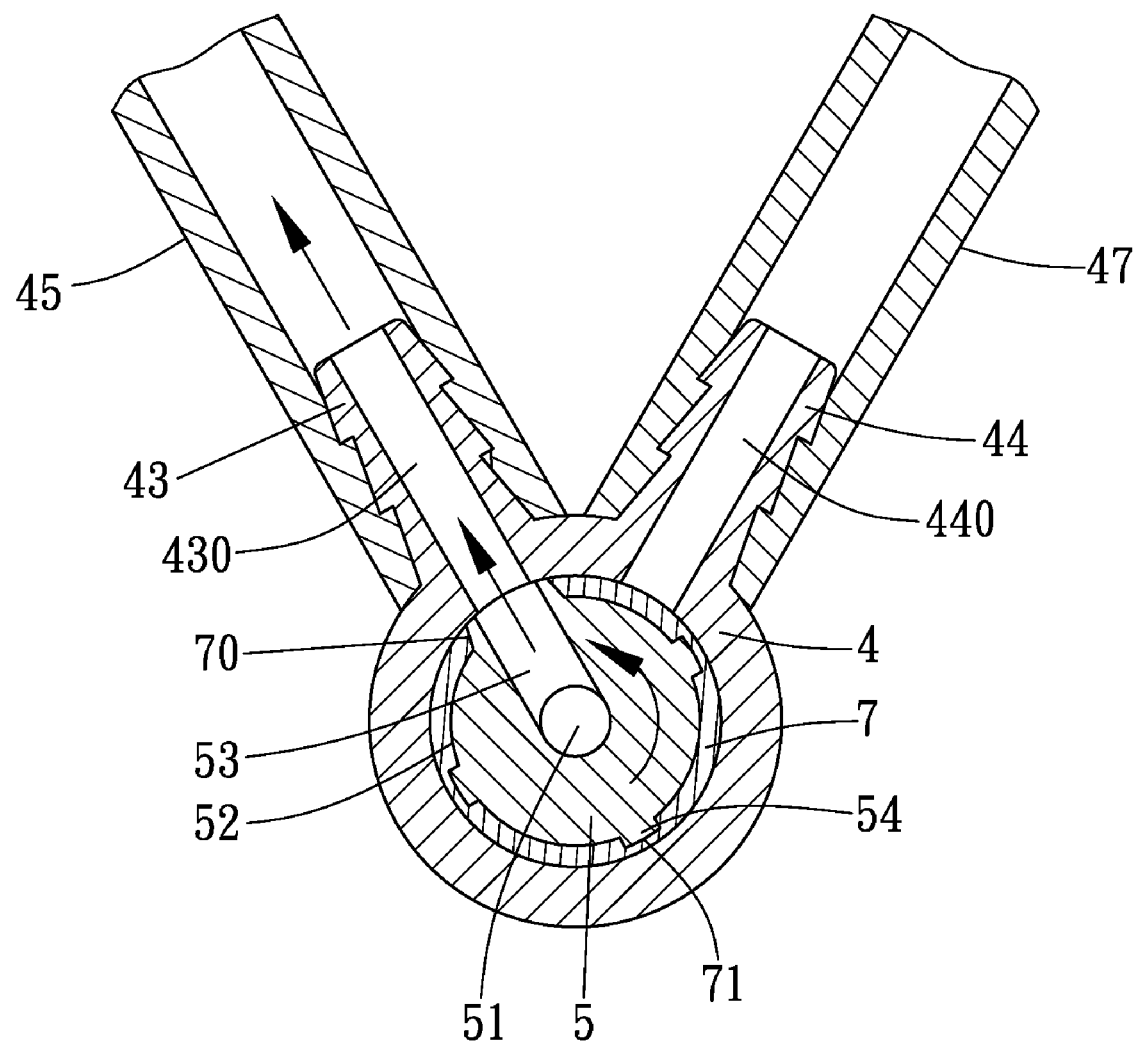
FIG. 5 is a cross-sectional view of a vent hole of the change valve aligned to a first guide tube (45) in the present invention; and, FIG. 6 is a cross-sectional view of the vent hole of the change valve aligned to a second guide tube (47) in the present invention.
Figure 6:
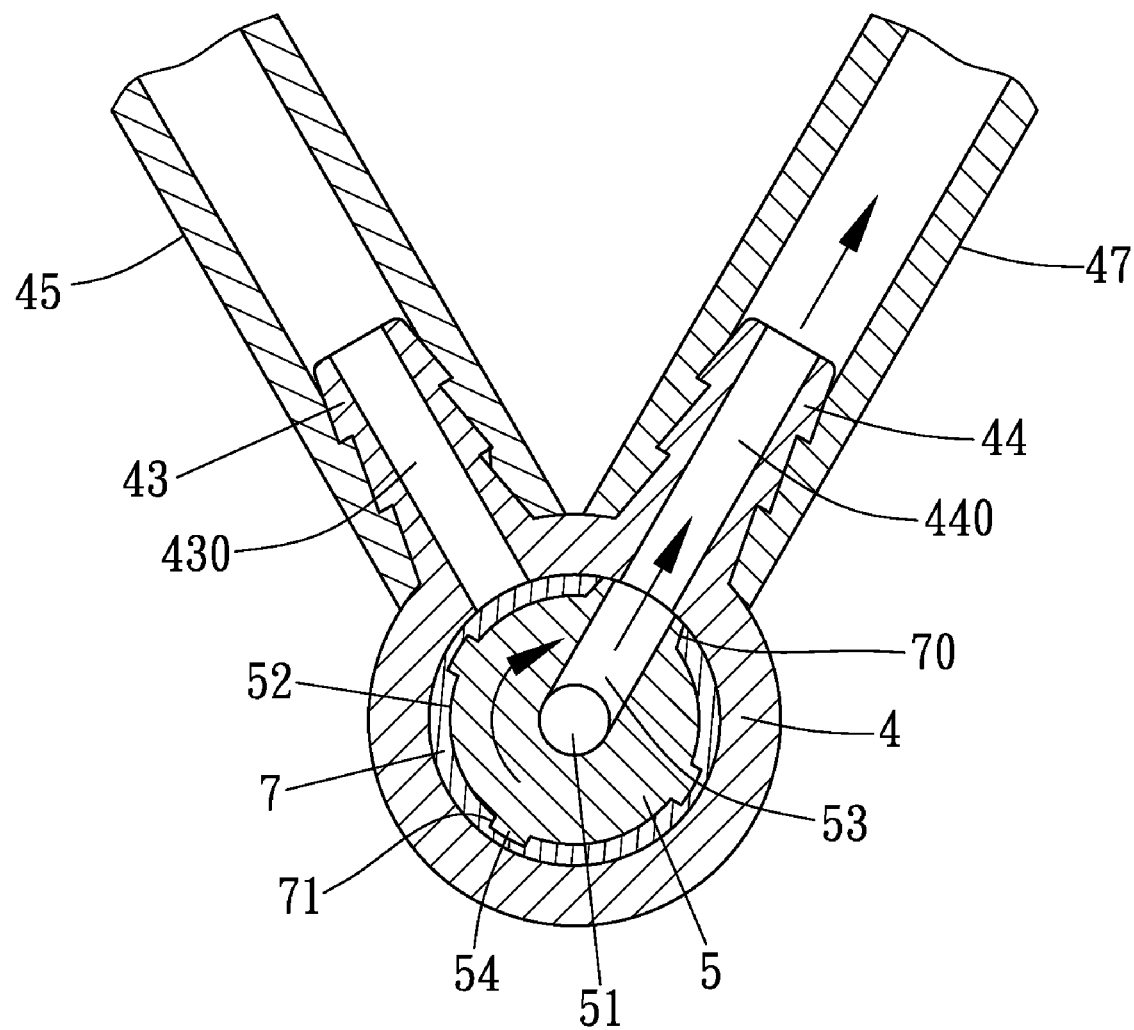

A preferred embodiment of a change valve for an air compressor in the present invention, as shown in FIGS. 2, 3 and 4, is connected to the vent tube 21 of the cylinder 20 of an air compressor 2, including a connector 3, a valve base 4, a valve body 5, an anti-leak gasket 6, a sleeve 7, and a button 8.

The connector 3 is composed of a connect tube 30 having a first end connected stably to the vent tube 21 and a second end formed with a flange 31 and a center air hole 32 communicating with the connect tube 30.

The valve base 4 is cylindrical, connected to the second end of the connector 3 and provided with a chamber 40 in its interior, an annular groove formed in a first end, a hole 42 in a second end communicating with the chamber 40, a first connect tube 43 and a second connect tube 44 extending radially and spaced apart on an outer surface and having a center hole 430 and 440 respectively to communicate with the chamber 40. Then a first guide tube 45 and a second guide tube 47 are respectively connected to the first and the second connect tube 43 and 44, with a first joint 46 and a second joint 48 respectively fixed with an outer end of the first and the second guide tube 45 and 47.

The valve body 5 is contained in the chamber 40 of the valve base 4, provided with an annular groove 50 and an air hole 51 formed in a first end surface, an vent hole 53 formed in an annular wall and communicating with the air hole 51, a plurality of projections 54 formed space apart on the annular recess 52, a rod member 55 formed to extend axially from a second end and provided with a flat surface 56 on its end.

The anti-leak gasket 6 is inserted in the annular groove 50 of the valve body 5.

The sleeve 7 is fitted around the annular recess 52 of the valve body 51 provided with a vent hole 70 in its annular wall to face the vent hole 53, and a plurality of insert recesses 71 formed spaced apart on an inner surface of the annular wall.

The button 8 is affixed on the outer end of the rod member 55 of the valve body 5, provided with an insert hole 80 in the center of an inner end and a position recess 81 formed in an outer end surface.

In assembling, referring to FIGS. 2, 3 and 4, firstly the sleeve 7 is put around the annular recess 52 of the valve body 5, with the projections 54 in the recess 52 fitting stably with the insert recesses 711 and with the vent hole 70 of the sleeve 7 facing to the vent hole 53 of the valve body 5. Then the anti-leak gasket 6 is shoved in the annular groove 50 of the valve body 5, and then the valve body 5 with the related components combined together are inserted in the chamber 40 of the valve base 4, with the rod member 55 extending through the hole 42 of the valve base 4, and with the vent hole 53 aligned to the air hole 430 of the first connect tube 43 or the air hole 440 of the second connect tube 44. Next, the valve base 4 is combined with the connector 3, with the flange 31 fitting stably in the annular groove 41 of the valve base 4. Then the valve base 4 and the connector 3 are welded together firmly by means of supersonic process, and then the button 8 is combined with the outer end of the rod member 55 of the valve body 5, with the end with the flat surface 56 fitting with the insert hole 80 to secure the button 8 with the rod member 55 of the valve body 5, with the position recess 81 aligned to either the first or the second connect tube 43 or 44, finishing the assembly of the change valve for an air compressor.

Next, in using, referring to FIGS. 3 to 6, either the second joint 46 or the second joint 48 is threadably connected to a tire air valve of different structures, and if the first joint 46 is selected, the button 8 is turned just to let the position recess 81 aligned to the first connect tube 43 of the valve base 4, with the valve body 5 with the rod member 55 turned synchronously by the button 8. Then the vent hole 53 of the valve body 5 is aligned to the air hole 430 of the first connect tube 43. As the air compressor operates, compressed air is to flow through the vent tube 21 to the air hole 32 of the connector 3, and then into the valve body 5 via the air hole 51, The compressed air may then flow through the vent hole 53 of the valve body 5 into the first guide tube 45 via the air hole 430 of the first connect tube 43, and finally into the tire air valve via the first joint 46 at the end of the first guide tube 45. In this way compressed air is pumped into the object through the first guide tube 45.

On the contrary, if pumping air is to be carried out through the second joint 48, the button 8 is reversely turned, letting the position recess 81 aligned to the second connect tube 44 of the valve base 4, with the button 8 forcing the valve body 5 together with the rod member 55 rotate synchronously. Then the air compressor 5 operates to compresses air to flow through the vent tube 21 into the air hole 32 of the connector 3 and then into the valve body 5 via the air hole 51. So compressed air flows into the second guide tube 47 through the vent holes 53 and the air hole 440, and finally into an object to be pumped with air via the second joint 48 at the outer end of the second guide tube 47. In this way the second guide tube 47 is selectably used for pumping air into the object.

Therefore, the change valve matching with the button 8 makes interchanging of the connect tubes with the vent hole of the valve body possible for matching with different air valves of objects with great convenience.

While the preferred embodiment of the invention has been described above, it will be recognized that various modifications may be made therein and the appended claims are intended to cover all such modifications that may fall within the spirit and scope of the invention.

What is claimed is:

1. A change valve for an air compressor, said compressor having a cylinder provided with a vent tube, and
   characterized in that said change valve comprises
   a connector provided with a connect tube formed at a first end connected with a lower end of said vent tube and a second end provided with an air hole communicating with said connect tube;
   a valve base connected to said second end of said connector and provided with a chamber in its interior and a hole formed in a second end to communicate with said chamber, at least two connect tubes fixed to extend radially spaced apart on an outer annular surface of said valve base and having a center hole communicating with said chamber, a guide tube connected with each said connect tube and having a joint fixed on an outer end;
   a valve body contained in said chamber of said valve base and provided with a first end formed with an annular groove on its surface, an air hole bored in said first end surface, said valve body further provided with an annular recess in an outer annular wall, a vent hole formed in said annular recess and communicating with said air hole, a plurality of projections formed spaced apart on said annular recess, and a rod member extending axially from a second end;
   an anti-leak gasket inserted in said annular groove of said valve body;
   a sleeve fitted around said annular recess of said valve body and provided with a vent hole in an annular wall and a plurality of insert recesses spaced apart on an inner surface; and,
   a button combined with an outer end of said rod member of said valve body.

2. The change valve for an air compressor as claimed in claim 1, wherein said connector is further provided with a flange on a second end, and said valve body is provided with an annular groove for said flange of said connector to fit therein.

3. The change valve for an air compressor as claimed in claim 1, wherein said rod member of said valve body is provided with a flat surface on its outer end.

4. The change valve for an air compressor as claimed in claim 1, wherein said button is provided with an insert hole in an inner end surface and a position recess formed in an outer end surface.

* * * * *